(12) United States Patent
Klotzkin et al.

(10) Patent No.: US 8,379,286 B2
(45) Date of Patent: Feb. 19, 2013

(54) INTEGRATED ANGLE OF ARRIVAL SENSING AND DUPLEX COMMUNICATION WITH CATS-EYE MULTIPLE QUANTUM WELL MODULATING RETROREFLECTOR

(75) Inventors: David J. Klotzkin, Vestal, NY (US); Peter G. Goetz, Springfield, VA (US); William S. Rabinovich, Silver Spring, MD (US); Mike S. Ferraro, Columbia, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 145 days.

(21) Appl. No.: 13/116,430

(22) Filed: May 26, 2011

(65) Prior Publication Data

US 2011/0292485 A1 Dec. 1, 2011

Related U.S. Application Data

(60) Provisional application No. 61/349,526, filed on May 28, 2010.

(51) Int. Cl.
*G02B 26/00* (2006.01)
(52) U.S. Cl. ........................................................ 359/239
(58) Field of Classification Search .................. 359/239, 359/247
See application file for complete search history.

(56) References Cited

U.S. PATENT DOCUMENTS

| | | | |
|---|---|---|---|
| 5,020,153 A | 5/1991 | Choa et al. | |
| 5,093,833 A | 3/1992 | Pang et al. | |
| 5,117,301 A | 5/1992 | Tsumura | |
| 5,355,241 A | 10/1994 | Kelley | |
| 5,479,539 A | 12/1995 | Goldsmith et al. | |
| 5,608,561 A | 3/1997 | Marcuse et al. | |
| 5,844,709 A | 12/1998 | Rabinovich et al. | |
| 5,966,227 A | 10/1999 | Dubois et al. | |
| 6,154,299 A | 11/2000 | Gilbreath et al. | |
| 6,624,916 B1 | 9/2003 | Green et al. | |
| 7,719,746 B2 | 5/2010 | Goetz et al. | |
| 2006/0118729 A1* | 6/2006 | Chin et al. | 250/370.08 |
| 2007/0189779 A1 | 8/2007 | Murphy et al. | |
| 2009/0073536 A1 | 3/2009 | Goetz et al. | |
| 2010/0303466 A1 | 12/2010 | Chand et al. | |

OTHER PUBLICATIONS

Biermann, M. L., Rabinovich, W. S., Mahon, R., and Gilbreath, G. C., "Design and Analysis of a Diffraction-Limited Cat's-Eye Retroreflector," Optical Engineering, vol. 41, Iss. 7, pp. 1655-1660 (Jul. 2002).
Burgers, A. R., "How to design optimal metallization patterns for solar cells", Progress in Photovoltaics: Research and Applications; vol. 7, No. 6, pp. 457-461, 1999.

(Continued)

*Primary Examiner* — Joseph P Martinez
(74) *Attorney, Agent, or Firm* — Amy Ressing; Sally A. Ferrett

(57) ABSTRACT

A modulating retroreflector system includes a modulating retroreflector having a plurality of multiple quantum well modulator pixels and at least one transimpedance amplifier. The transimpedance amplifier receives a photocurrent generated by at least one of the plurality of modulator pixels. Each pixel is capacitively coupled to a current driver, which applies a high frequency digital electrical signal to the pixel when the voltage at the output of the transimpedance amplifier exceeds a threshold value. The modulated output of the retroreflector is reflected toward the source of the received optical beam. The system activates high frequency current drivers for only the illuminated pixels, eliminating the need for a separate angle of incidence sensor and reducing power requirements. A low frequency FSK signal can be superimposed on the DC optical interrogation beam and recovered as the unfiltered output of the transimpedance amplifier, to provide simultaneous bidirectional communication without a half-duplex communication protocol.

19 Claims, 4 Drawing Sheets

OTHER PUBLICATIONS

Creamer, N.G., Gilbreath, G.C., Meehan, T.J., Vilcheck, M.J., Vasquez, J.A., Rabinovich, W.S., and Goetz, P.G., "Interspacecraft Optical Communication and Navigation Using Modulating Retroreflectors," Jour.of Guidance Control and Dynamics, vol. 27,No. 1, pp. 100-106 (Jan./Feb. 2004).

Davidson, F. M., Bucaille, S., Gilbreath, G. C., and Oh, E., "Measurements of Intensity Scintillations and Probability Density Functions of Retroreflected Broadband 980-Nm Laser Light in Atmospheric Turbulence," Optical Engineering, vol. 43, Iss.11, pp. 2689-2695 (Nov. 2004).

Fritz et al., "Vertical-Cavity optical modulator for 1.32 um grown on graded (InGaAl)As buffer", Appl. Phys. Lett. vol. 63, No. 4, Jul. 26, 1993, pp. 494-491.

Gilbreath et al., NRL Memorandum Report NRL/MR/8120-97/9875, Performance Characteristics of a Retroreflector Array Optimized for LEO Spacecraft, Dec. 31, 1997.

Gilbreath, G. C., Rabinovich, W. S., Meehan, T. J., Vilcheck, M. J., Stell, M., Mahon, R., Goetz, P. G., Oh, E., Vasquez, J. A., Cochrell, K., Lucke, R. L., and Mozersky, S., "Progress in Development of Multiple-Quantum-Well Retromodulators forFree-Space Data Links," Optical Engineering, vol. 42, Iss. 6, pp. 1611-1617 (Jun. 2003).

Gilbreath, G. C., Rabinovich, W. S., Meehan, T. J., Vilcheck, M. J., Mahon, R., Burns, R., Ferraro, M., Sokolsky, I., Vasquez, J. A., Bovais, C. S., Cochrell, K., Goins, K. C., Barbehenn, R., Katzer, D. S., Ikossi-Anastasiou, K., and Montes, M. J.,"Large-Aperture Multiple Quantum Well Modulating Retroreflector for Free-Space Optical Data Transfer on Unmanned Aerial Vehicles," Optical Engineering, vol. 40, Iss. 7, pp. 1348-1356 (Jul. 2001).

Gilbreath, G.C., Creamer, N. G., Rabinovich, W. S., Meehan, T.J., Vilchek, M.J., Vasquez, J.A. Mahon, R., Oh, E., Goetz, P.G., and Mozersky, S., "Modulating retro-reflectors for space, tracking, acquisition, and ranging using multiple quantum-welltechnology", Proc. SPIE 4821, pp. 494-507 (Dec. 2002).

Gilbreath, G.C., Rabinovich, W., "Large-Aperture Multiple Quantum Well Modulating Retroreflector for Free-Space Optical Data Transfer on UAVs", NRL Review, 2001.

Gilbreath, G.C., Rabinovich, W.S., Moore, C.I., Burris, H.R., Mahon, R., Grant, K.J., Goetz, P.G., Murphy, J.L., Suite, M.R., Stell, M.F., "Progress in laser propagation in a maritime environment at the Naval Research Laboratory" Proc. SPIE, vol. 5892, pp. 58921V (2005); conference date Jul. 31, 2005; online publication date Sep. 12, 2005.

Gilbreath, G.C. et al., "Real-Time 1550 nm Retromodulated Video Link", Proceedings of the 2003 IEEE Aerospace Conference, Paper 1560, pp. 1-7, (2003).

Goetz, P.G., W.S. Rabinovich, T.J., Mechan, D.S. Katzer, S.C. Binari, E.E. Funk, G.C. Gilbreath, R. Mahon, L. Swingen, J. Rende, E. Waluschka, G. Lepore, A. Phan, "Modulating Retroreflector Implementation of MIL-STD-1553 Protocol with Free-Space Optics", IEEE Aerospace Conference Proceedings, vol. 4, pp. 1799-1808, Big Sky, MT, (Mar. 2003).

Goetz, P.G., et al., "Practical Considerations of Retroreflector Choice in Modulating Retroreflector Systems", IEEE LEOS 2005 Summer Topicals, vol. TuA3.5 pp. 22-27, conference date Oct. 2005.

Goetz, P.G., R. Mahon, T.H. Stievater, W.S. Rabinovich, and S.C. Binari, "High-speed large-area surface-normal multiple quantum well modulators", Proc. SPIE, vol. 5160, pp. 346-354, Jan. 2004.

Goetz, P.G., et al., "Multiple quantum well-based modulating retroreflectors for inter- and intra-spacecraft communication", Proc. SPIE, Photonics for Space Environments XI, vol. 6308, pp. 63080A-1-63080A-11, (2006).

Goetz, P.G., Rabinovich, W.S., Binari, S.C., and Mittereder, "High-Performance Chirped Electrode Design for Cat's Eye Retro-Reflector Modulators", IEEE Photonic Technology Letters, vol. 18, No. 21, Nov. 1, 2006, pp. 2278-2280.

Goetz, P.G., Binari, S.C., Mahon, R., Swingen, L., and Rabinovich, W.S., "High-Speed Cat's Eye Multiple Quantum Well Modulating Retroreflectors", viewgraphs shown at SPIE Annual Meeting, San Diego, CA, Jul. 31, 2005.

Hallstig, E., Ohgren, J., Allard, L., Sjoqvist, L., Engstrom,D., Agren, D., Junique, S., Noharet, B., "Retrocommunication using electroabsorption modulators and nonmechanical beam steering", Optical Engineering, vol. 44, No. 4, Apr. 2005, pp. 045001-1-045001-8.

Handerek, V. A. and Laycock, L.C., "Feasibility of retroreflective free-space optical communication using retroreflectors with very wide field of view," Proc. SPIE Int. Soc. Opt. Eng. 5614, pp. 1-9, Dec. 2004 (Conference date Oct. 28, 2004).

Katzer, D. S., Rabinovich, W. S., Ikossi-Anastasiou, K., and Gilbreath, G. C., "Optimization of Buffer Layers for InGas/AlGaAs Pin Optical Modulators Grown on GaAs Substrates by Molecular Beam Epitaxy," Journal of Vacuum Science & Technology B, vol. 18, Iss. 3, pp. 1609-1613 (May/Jun. 2000).

Moore, C.I, et al., "Spatial Intensity Correlation and Aperture Averaging Measurements in a 20-mile Retroreflected Lasercom Link", Proc. SPIE, Jan. 2004, vol. 5160, pp. 474-482.

Murphy, J.L., Gilbreath, G.C., Rabinovich, W.S., Sepantaie, M.M., and Goetz, P.G., "FM-MRR analog audio system", Proc. SPIE 5892, pp. 58921X1-58921X8 (Oct. 2005).

Murphy, J.L., Gilbreath, G.C., Rabinovich, W.S., Sepantaie, M.M., and Goetz, P.G., "FM-MRR analog audio system", poster, SPIE Conference, Free Space Laser Communications V, Aug. 1, 2005.

Namazi, N., Burris, H. R., Conner, C., and Gilbreath, G. C., "Synchronization and Detection of Binary Data in Free-Space Optical Communication Systems Using Haar Wavelet Transformation," Optical Engineering, vol. 45, Iss. 1, pp. 015001-1-015001-13(Jan. 2006).

Plett, M., Rabinovich, W.S., Mahon, R., Ferraro, M.S., Goetz, P.G., Moore, C.I., and Freeman, W., "Free-space optical communication link across 16 kilometers over the Chesapeake Bay to a modulated retroreflector array", Opt. Eng., vol. 47, pp. 045001-1-045001-10, published online Apr. 17, 2008, DOI:10.1117/1.2903104.

Rabinovich, W. S., Mahon, R., Burns, H. R., Gilbreath, G. C., Goetz, P. G., Moore, C. I., Steil, M. F., Vilcheck, M. J., Witkowsky, J. L., Swingen, L., Suite, M. R., Oh, E., and Koplow, J., "Free-Space Optical Communications Link at 1550 Nm UsingMultiple-Quantum-well Modulating Retroreflectors in a Marine Environment," Optical Engineering, vol. 44, Iss. 5, pp. 056001-1-056001-12 (May 2005).

Rabinovich, W.S., Goetz, P.G., Mahon, R., Swingen, L., Murphy, J., Gilbreath, G.C., Binari, S.C., and Waluschka, E., "Performance of cat's eye modulating retro-reflectors for free-space optical communications", Proc. SPIE 5550, pp. 104-114 (Oct. 2004).

Rabinovich, W.S., Goetz, P.G., Mahon, R., Swingen, L., Murphy,J., Ferraro, M., Burris Jr., H.R. , Moore, C., Suite, M., Gilbreath, G.C., Binari S., and Klotzkin, D., "45-Mbit/s Cat's Eye Modulating Retroreflectors," Opt. Engr., vol. 46, No. 10, pp. 104001-1-104001-8, (Oct. 2007).

Rabinovich W., et al., "Free-Space Optical Communications Link at 1550nm using Multiple-Quantum-Well Modulating Retroreflectors in a Marine Environment", Optical Engineering, vol. 44, No. 5, pp. 056001-1-056001-12, May 2005.

Rabinovich, W. S., Mahon, R., Goetz, P. G., Waluschka, E., Katzer, D. S., Binari, S. C., and Gilbreath, G. C., "A Cat'S Eye Multiple Quantum-Well Modulating Retro-Reflector," IEEE Photonics Technology Letters, vol. 15. No. 3, pp. 461-463 (2003).

Serreze, H. B., "Optimizing Solar Cell Performance by Simultaneous Consideration of Grid Pattern Design and Interconnect Configuration," 1978. Conference Record of the IEEE Photovoltaic Specialists Conference pp. 609-614, 13th IEEE PVSC, 1978.

Walters, R. J., Murphy, J. L., Rabinovich, W. S., Gilbreath, G. C., Wilt, D. M., Smith, M. A., Krasowski, M. J., Jenkins, P. P., Scheiman, D., Warner, J. H., Messenger, S. R., Lorentzen, J. R., and Summers, G. P., "Photovoltaically PoweredModulating Retroreflectors," Optical Engineering, vol. 45, Iss. 3, pp. 034003-1-034003-6 (Mar. 2006).

Wasiczko, L.M., et al., Optical Communication and Navigation for Spacecraft Docking Using Modulating Retroflectors. Proc. SPIE, vol. 5892, pp. 117-125, Sep. 2005.

* cited by examiner

INTEGRATED ANGLE OF ARRIVAL SENSING AND DUPLEX COMMUNICATION WITH CATS-EYE MULTIPLE QUANTUM WELL MODULATING RETROREFLECTOR

CROSS-REFERENCE TO RELATED APPLICATIONS

This application is a non-provisional under 35 USC 119(e) of, and claims the benefit of, U.S. Provisional Application 61/349,526 filed on May 28, 2010, the entire disclosure of which is incorporated herein in its entirety.

BACKGROUND

1. Technical Field

The present invention relates generally to retroreflectors, and more particularly, to modulating retroreflectors useful for returning a encoded signal to the source of an optical interrogation beam.

2. Description of the Background Art

Modulating retroreflectors were demonstrated before the invention of the laser, but were restricted to short distances and low data rates. The first disclosure of a modulating retroreflector appears in a 1903 British patent, No. 21,856 titled "Improvements in and Means for Signaling and Indicating Position of Objects" to Sir Howard Grubb. Harry Stockman, "Communications by Means of Reflected Power," Proceedings of the IRE, pp. 1196-1204, October 1948, provides another early description of a modulating retroreflector for free-space optical communications.

U.S. Pat. No. 4,361,911 to R. G. Buser et al. describes a laser retroreflector system suitable for identifying whether a target is a friend or foe in a battlefield situation.

In the 1990's modulating retroreflectors were developed that allow free-space optical communication between a node with minimal power, weight, and pointing ability and a node with higher power, weight, and pointing ability. For example, U.S. Pat. No. 6,154,299 to G. Charmaine Gilbreath, Steven R. Bowman, William S. Rabinovich, Charles H. Merk, and H. E. Senasack, "Modulating retroreflector using multiple quantum well technology", the entire disclosure of which is incorporated by reference herein, describes a modulating retroreflector developed at the Naval Research Laboratory. These modulating retroreflector systems are particularly suitable for communications links between aircraft and ground stations, because most of the weight and power requirements are relegated to the ground-based interrogator station, allowing the aircraft's modulator to be small, light, and low-power.

There are two basic classes of retro-reflectors, "cat's eye" and corner cube retro-reflectors. "Cat's eye" retro-reflectors combine lenses and/or mirrors and incorporate an optical focus. Several variations of cat's eye retro-reflectors are described in Mark L. Biermann et al., "Design and analysis of a diffraction-limited cat's-eye retroreflector," Opt. Eng., Vol. 41, pp. 1655-1660, (2002). In contrast, corner cube retro-reflectors (CCRs) are nonfocusing. Some tradeoffs between modulating retro-reflectors of the corner cube type and the cat's eye type are discussed in P. G. Goetz, W. S. Rabinovich, R. Mahon, L. Swingen, G. C. Gilbreath, and J. Murphy, "Practical Considerations of Retroreflector Choice in Modulating Retroreflector Systems," IEEE LEOS 2005 Summer Topicals, San Diego, Calif., 25-27 Jul. 2005.

Recent advances in optoelectronic devices and free-space optics have greatly increased the capabilities of modulating retroreflector systems. Examples are discussed in "Peter G. Goetz, William S. Rabinovich, Rita Mahon, Mike S. Ferraro, James L. Murphy, H. Ray Burris, Mena F. Stell, Chris I. Moore, Michelle R. Suite, Wade Freeman, G. C. Gilbreath, and Steven C. Binari, "Modulating Retro-Reflector Devices and Current Link Performance at the Naval Research Laboratory," MILCOM 2007, Orlando, Fla., October 2007" and Peter G. Goetz, William S. Rabinovich, Timothy J. Meehan, D. S. Katzer, Steven C. Binari, Eric E. Funk, G. Charmaine Gilbreath, Rita Mahon, Lee Swingen, John Rende, Eugene Waluschka, Gary Lepore, and Anthony Phan, "Modulating Retroreflector Implementation of MIL-STD-1553 Protocol with Free-Space Optics", Proceedings of the 2003 IEEE Aerospace Conference, Paper No. 1559, 2003.

U.S. Pat. No. 7,719,746 to Goetz et al., and P. G. Goetz, W. S. Rabinovich, S. C. Binari, and Mittereder, "High-Performance Chirped Electrode Design for Cat's Eye Retro-Reflector Modulators", IEEE Photonic Technology Letters, vol. 18, No. 21, Nov. 1, 2006, pp. 2278-2280, describe a chirped electrode for use in a multiple quantum well modulating retroreflector. Gridded electrodes for use in solar photovoltaic cells are discussed in H. B. Serreze, "Optimizing Solar Cell Performance by Simultaneous Consideration of Grid Pattern Design and Interconnect Configuration," in the Conference Record of the IEEE Photovoltaic Specialists Conference pp. 609-614, 13th IEEE PVSC, pp. 609-614, 1978, and in A. R. Burgers, "How to design optimal metallization patterns for solar cells", Progress in Photovoltaics: Research and Applications; Vol. 7, No. 6, pp. 457-461, 1999.

U.S. Pat. No. 7,715,727 to Murphy et al. describes a system and method for transmitting analog signals with a modulating retroreflector using hybrid amplitude and frequency modulation. In W. S. Rabinovich et al., "45 Mbit/s cat's-eye modulating retroreflectors", Optical Engineering, Vol. 46, No. 10, pp 104001-1-104001-8, October 2007, describes various MQW-MRR optical communications systems configured as cat's-eye retroreflector systems with the multiple quantum well located in the focal plane of the cat's eye optic.

U.S. Patent Publication Number 20070297801A1, to Rabinovich et al., describes an optical communication system with a cat's eye modulating retro-reflector (MRR) assembly. The system includes a beam deflector for decreasing the field of view of the retroreflector, and can include a separate angle of arrival sensor for sensing the arrival angle of the interrogating beam in order to select which modulator pixels to activate.

L. D. Westbrook and D. G. Moodie, in "Simultaneous bi-directional analogue fibre-optic transmission using an electroabsorption modulator", Electronics Letters, Vol. 32, No. 19, pp. 1806-07, September 1996, discuss using a multiple quantum well electroabsorption modulator as both a photodetector and a modulator in a frequency-division-multiplexed analog fiber optic system.

In some previous systems having a number of multiple quantum well pixels, all of the pixels would have been driven whether or not they were illuminated. This configuration generated a lot of heat and required a high power level. In other designs, a separate pixel array has been used to identify which modulator pixels are illuminated, in order to select the corresponding drivers so that only the illuminated pixels are driven. In this case, the angle of arrival sensor includes an array of reverse-biased photodiodes and a second set of optics, with the second optics being precisely aligned to the primary cat's eye optic, and a carefully calibrated correspondence between the photodiode array and the modulator array over a wide range of input angles. See, for example, the system described in W. S. Rabinovich et al., "45 Mbit/s cat's-eye modulating retroreflectors", Optical Engineering, Vol. 46, No. 10, pp 104001-1-104001-8, 2007.

BRIEF SUMMARY

An aspect of the invention is directed to a modulating retroreflector system having a modulating retroreflector having a plurality of multiple quantum well modulator pixels and at least one transimpedance amplifier arranged to receive a photocurrent generated by one of the plurality of modulator pixels. Each modulator pixel is capacitively coupled to a current driver that applies a high frequency digital electrical signal to the modulator pixel only if the DC voltage output of the transimpedance amplifier exceeds a threshold value.

The system can also include a cat's eye optic arranged to focus incoming light onto the plurality of multiple quantum well modulator pixels. The pixels can include a reflective coating arranged at the side of the pixels facing away from the cat's eye optics. The high frequency digital electrical signal can be Manchester encoded data. There can be a one-to-one correspondence between the pixels and the transimpedance amplifiers, or each of the at least one transimpedance amplifiers can receive photocurrents from a plurality of modulator pixels.

The transimpedance amplifier output can be low-pass filtered to output only DC voltage. The system can include an output port at the output of the transimpedance amplifier configured to output a low frequency signal carried on an optical interrogation beam. The input to the transimpedance amplifier can be low-pass filtered.

The retroreflector system can be provided in combination with a remote optical assembly having both a transmitter and receiver, said transmitter configured to transmit laser optical energy to the retroreflector system, with the receiver configured to receive the modulated retroreflected optical energy from the retroreflector system.

An aspect of the invention is directed to a method for receiving optical energy from a laser source, modulating the optical energy, and retroreflecting the modulated optical energy toward the laser source, in a modulating retroreflector system having an array of multiple quantum well modulator pixels. The method includes receiving the laser optical energy so as to illuminate at least one of the pixels, each of the illuminated pixels generating a DC photocurrent, transmitting each generated DC photocurrent into a transimpedance amplifier, activating a current source coupled to the illuminated pixel only if the DC voltage output of the transimpedance amplifier exceeds a threshold value, with the current source driving the illuminated pixel with a digital signal to modulate the incoming optical energy.

Each of the illuminated multiple quantum well modulating retroreflector pixels reflecting the modulated incoming optical energy toward the laser source. The digital signal can be Manchester encoded. Each transimpedance amplifier receives DC photocurrent from only one modulator pixel, or each transimpedance amplifier can receive photocurrents from a plurality of modulator pixels. The received optical energy from a laser source is continuous wave optical energy.

Duplex communication can be provided with an incoming optical energy being continuous wave interrogation beam carrying a low frequency signal, and the system outputting the low frequency signal at an output port of the transimpedance amplifier.

The low frequency signal can be a frequency shift keyed signal, with a frequency of less than about 100 kHz.

Additional details will be apparent from the following detailed description of embodiments of the invention.

DETAILED DESCRIPTION OF THE INVENTION

The following discussion describes a modulating retroreflector system for communication between the modulator and an interrogator that uses a single optical aperture and a single semiconductor modulator device that acts simultaneously as a modulator and a photodiode. The photodiode aspect of the modulator pixels allows them to act as an angle of arrival sensor, so as to selectively activate electronic drivers for only those pixels in the focal spot of the incoming interrogation beam.

Figure 1:
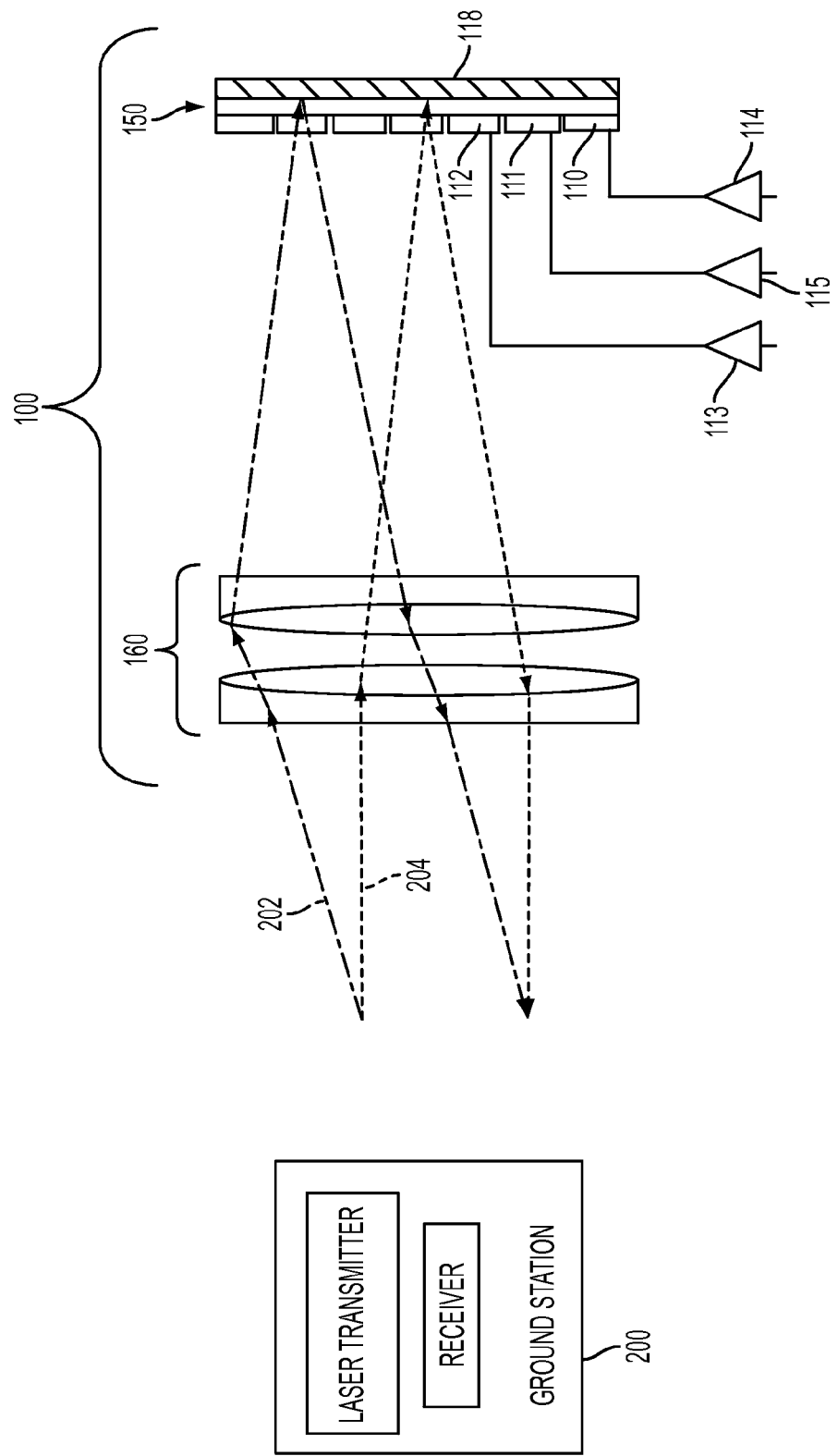
FIG. 1 is an illustration of an optical system with a cat's eye retroreflecting modulator system and a cat's eye optic.

FIG. 1 illustrates cat's eye modulating retroreflector system 100 that includes an array 150 of multiple quantum well modulators, electronic drivers for the modulator pixels, and a cat's eye optic 160. The cat's eye optic 160 is positioned between the multiple quantum well modulators and the incoming optical beam in order to reflect the modulated incoming optical beam back to its source. The ray traces 202 and 204 in FIG. 1 illustrate how incoming light at different incidence angles is reflected back in a direction parallel to the incoming light. For example, ray 204 arrives at an angle normal to the cat's eye optic 160, is refracted toward the MQW modulator array. The reflective surface of the MQW modulator array and the cat's eye optic reflect the modulated beam back toward the source at a normal angle that is parallel to the incoming ray 204. While the ray 202 arrives at a different angle, after modulation, it is reflected back toward the source in a direction parallel to the path of the incoming ray 202.

The multiple quantum well modulator array 150 includes a number of multiple quantum well (MQW) modulator pixels. Each of the modulator pixels 110, 111, 112 is individually driven by an electronic current driver 113, 114, 115, respectively. The current driver modulates the voltage across an individual MQW modulator pixel, altering the optical absorption of the pixel through the quantum-confined Stark effect. As shown in FIG. 1, a reflector 118 is positioned on the far side of the modulator pixel and reflects the modulated light back through the modulator pixel, with the cat's eye optic directing the modulated light back toward a receiver at the interrogation beam source (e.g., at the ground station).

The cat's eye optic 160 also focuses the incoming beam to a particular modulator spot. The collimated beam will only illuminate a small portion of the modulator array. For example, an incoming beam with a spot size of about one pixel diameter will illuminate at most four pixels for any incoming angle.

The cat's eye optic 160 can include a telecentric lens, as described in W. S. Rabinovich et al., "Cat's eye quantum well modulating retro-reflectors for free-space communication", Proc. SPIE, Vol. 4975, pp. 92-102, 2003. Other suitable cat's eye optics are described in U.S. Patent Publication No. 2007/0297805 to Rabinovich et al. The cat's eye optic 160 and the array of modulating multiple quantum well retroreflectors 150 can be configured together as an assembly, with a fixed distance between the cat's eye optic 160 and the retroreflector array 150.

Figure 2:
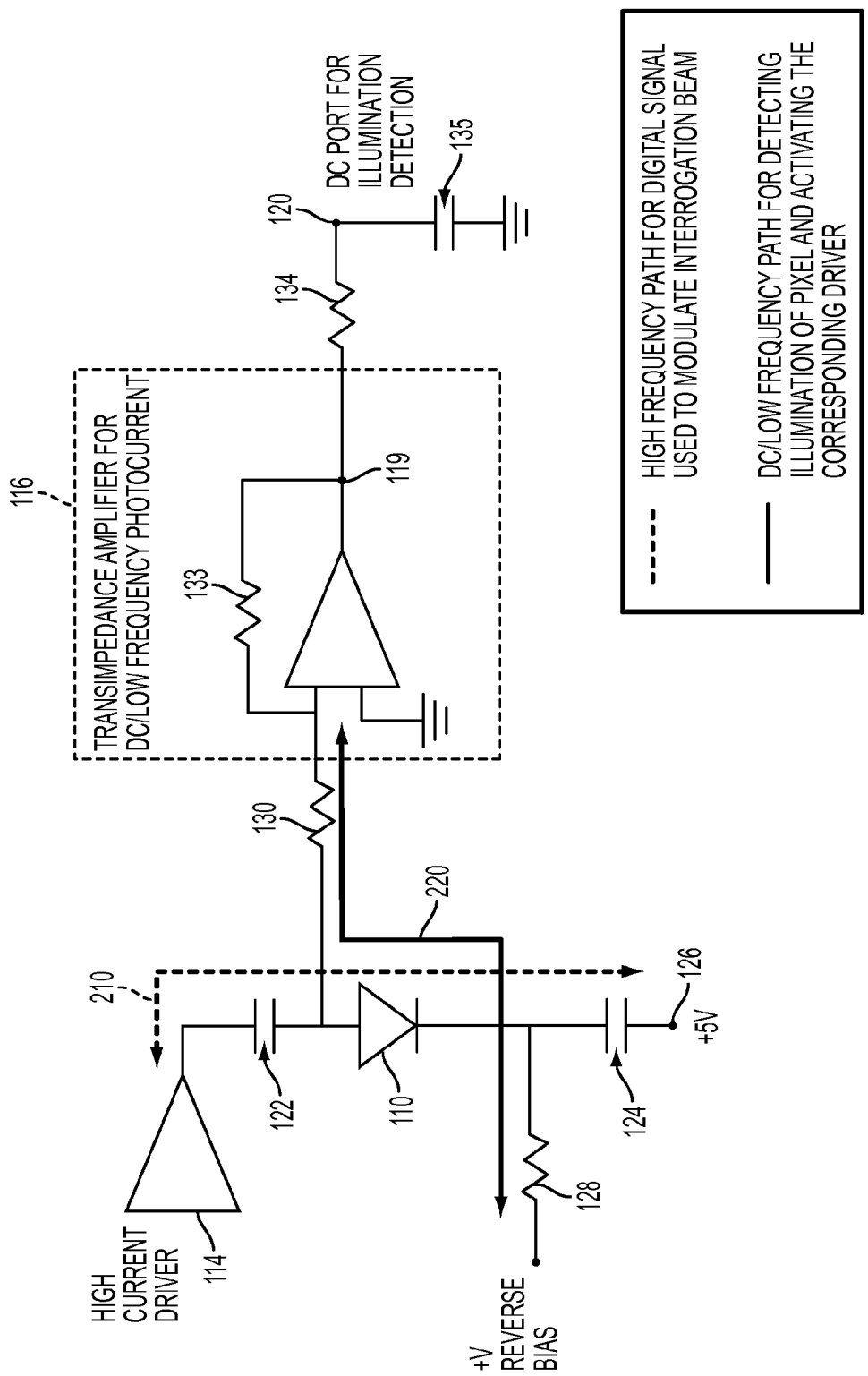
FIG. 2 illustrates an exemplary circuit for the modulating retroreflector system in accordance with an embodiment of the invention.

In operation, a CW laser interrogation beam is directed from a laser transmit/receive station 200 toward the modulating retroreflector system. The beam is focused on the modulator array 150 by the cat's eye optic 160 of FIG. 1. FIG. 2 illustrates a circuit that detects if a pixel is illuminated, so only the drivers for the illuminated pixels are activated. Those drivers produce a digital signal, which is AC coupled to the each of the illuminated multiple quantum well modulators. The multiple quantum well modulating retroreflectors modulate and reflect the interrogation beam toward the transmit/receive station 200.

FIG. 2 illustrates a circuit for one of the multiple quantum well retroreflector pixels of FIG. 1. The system illustrated in FIGS. 1 and 2 takes advantage of the dual nature of a multiple quantum well electro-absorption modulator as both a p-i-n-photodiode and as a MQW modulator that operates based on the quantum-confined Stark effect. When incoming light hits the modulating retroreflector pixel, a photocurrent is generated. The presence of the photocurrent indicates which pixel is illuminated, and only the illuminated pixels are driven by their corresponding driver to modulate the incoming beam.

The exemplary circuit illustrated in FIG. 2 separates the photocurrent and modulating current by frequency, allowing the same device to generate a low frequency photocurrent that indicates illumination of that pixel, and to modulate the incoming beam at the high frequency modulation rate upon receiving a high frequency current from the current driver. The modulating current is AC. The DC or low frequency photocurrent generated by the MQW modulator is small compared to the modulating current.

The high frequency path 210 includes a high current driver 114, the capacitors 122 and 124, and the MQW modulator 110. The low frequency path 220 includes the MQW modulator 110, a transimpedance amplifier 116, and a resistor 130 between the modulator 110 and the transimpedance amplifier 116.

Because of the modulator's high capacitance, it can require a high drive current, particularly at high speeds. For example, at speeds above 10 Mb/s, the modulator can be driven by a drive current of at least 100 mA. This drive current is provided by a high speed, high current driver 114. The high speed driver 114 is AC-coupled to the modulator 110 so the high frequency currents are coupled through the capacitor 122 between the driver and modulator, but are filtered from entering the transimpedance amplifier 116.

The transimpedance amplifier 116 is DC-coupled to the multiple quantum well modulator pixel 110, so DC photocurrent (from light on the MQW modulator 110 acting as a photodiode) and low frequency AC current (of the carrier tone, if used) appear at the output 119 of the amplifier. This circuit allows detection of μA levels of low frequency photocurrent even in the presence of a modulating current at levels of 100's of mA. Thus, the circuit can detect a very small DC or low frequency photocurrent that indicates that the pixel is illuminated, even when the current driver is generating a high frequency current that is four orders of magnitude higher in amplitude than the DC current).

The high current driver 114 provides a digital signal to the modulator 110, which modulates the digital signal onto an incoming CW laser interrogation beam. The digital data stream can be Manchester-encoded, with each logical bit represented by two digital bits, so a logical '1' is represented by a digital '10' and a logical '0' represented by a digital '01', for example. In Manchester encoding, the frequency content is clustered around the bit rate. In contrast, unencoded data can have significant low-frequency frequency content (for example, when long strings of '1's or '0's occur). Manchester encoding ensures many transitions in the data which aids in clock recovery and facilitates AC-coupled receiver configurations. Other coding systems that have a significant high frequency content and a small low frequency content can also be used.

The ones and zeros are imposed on the modulator by the high current driver. For example, with a five Volt reverse bias being a high absorbing '0' and a zero Volt bias being a '1'. Alternatively, the one Volt reverse bias can be a high absorbing '0' and a five Volt bias can be a '1'.

The high frequency path includes the high current driver 114, a capacitor that couples the driver 114 to the modulator 110, and the capacitor 124 between the modulator 110 and the positive voltage source 126. The resistor 130 filters the high frequency signal from reaching the transimpedance amplifier 116, allowing the driver 114 to provide a high frequency signal to the modulator pixel 110. The significant high frequency content of the encoded signal allows the circuit to separate the DC photocurrent and modulating signal sufficiently that the modulator pixels can self-detect illumination.

The high frequency path 210 is tuned to filter out the DC and low frequency signals while transmitting the large drive signal that is to be modulated onto the retroreflected optical beam. The circuit components can be selected to provide low pass filtering that will allow the desired low frequency signal to reach the transimpedance amplifier, while preventing the high frequency signal to reach the transimpedance amplifier.

The low frequency path includes a resistor 128, the modulator pixel 110, the transimpedance amplifier 116, the resistor 130 between the modulator and the transimpedance amplifier, and a resistor 132 following the transimpedance amplifier. In operation, when the modulator pixel 110 is illuminated, a DC photocurrent is generated by the modulator pixel and amplified by the transimpedance amplifier 116. The resistor 132 further low pass filters the output voltage of the transimpedance amplifier to provide DC detection. An output at the DC port 120 indicates that the pixel is illuminated. The output of the DC port controls the high current driver 114 so that when illumination is detected, the driver is activated. When the voltage at the DC port exceeds a predetermined threshold voltage, a controller activates the driver 114.

The low and high frequency currents are simultaneously present in the circuit, with high and low pass filters as described above located to filter the high frequency currents from the transimpedance amplifier 116 and to filter the low frequency currents from the driver 114. The filter components can be tailored to produce the desired cut-off frequencies for a particular application. For example, the resistor 134 and capacitor 135 at the output of the transimpedance amplifier 116 can be selected to have a cutoff frequency $f_c$ of approximately 1.5 kHz, although it can be higher or lower. The resistor 133 across the transimpedance amplifier can be selected based upon performance requirements. In this example, the resistor 133 has a resistance of approximately $R_f$=10 kOhms.

Although the high frequency current driver generates a high frequency current with much greater amplitude, the low pass filter blocks the majority of the high frequency current, so the voltage at the output port 119 of the transimpedance amplifier is primarily the result of the low-frequency or DC photocurrent generated by the multiple quantum well modulator acting as a photodiode.

The system of FIGS. 1 and 2 also enables communication over a low frequency band from the interrogation laser at the ground station 200 to the retroreflector system 100. A low frequency signal, in a frequency range of up to about 80 kHz to about 100 kHz, is superimposed on the DC optical interrogation beam transmitted by the laser transmitter. The low frequency signal carries frequency-shift keyed data to the retroreflector system.

The circuit of FIG. 2 is configured to allow the low frequency signal to pass through the transimpedance amplifier 116. The voltage at the output 119 of the transimpedance amplifier 116 is then further low pass filtered to provide DC detection at the DC port 120. The unfiltered output at the output port 119 of the transimpedance amplifier is coupled to a phase locked loop circuit (not shown) that detects the small AC component superimposed on the interrogator beam. The AC component can be approximately 5% of the amplitude of the DC voltage. In Frequency Shift Key (FSK) encoding, frequency changes in the AC component correspond to the transmitted "0"s or "1"s. Transmitting the FSK encoded data on the DC carrier beam is amplitude insensitive, which makes it very well suited for free space laser communication links that can have large moment-to-moment variations due to scintillation. This provides an integrated transmitter/receiver capability using frequency shift keying for full duplex communication with a single modulating retroreflector array.

Figure 4A:
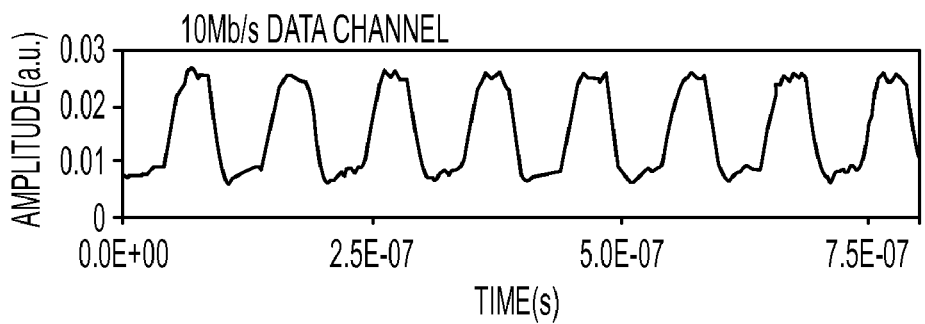
FIG. 4A plots the amplitude of an example 10 Mb/s data channel transmitted by the modulator of FIG. 2 in microamperes.
Figure 4B:
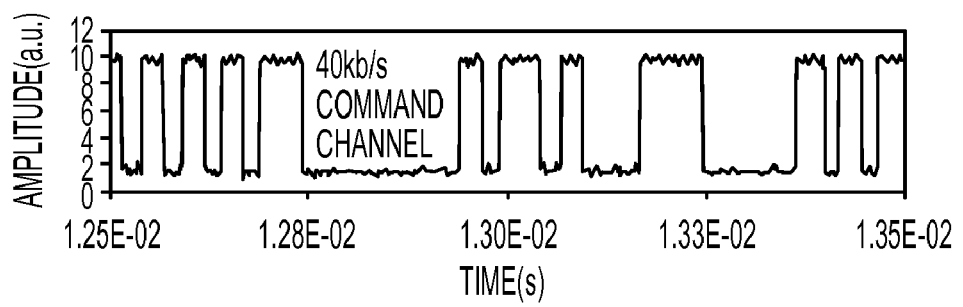
FIG. 4B plots the 40 kb/s command channel received by the same modulator pixel.

In this manner, the same modulator pixel can simultaneously modulate the interrogation beam with a 10 Mb/s data channel and receive a 40 kb/s command channel superimposed on the interrogation beam. FIGS. 4A and 4B shows simultaneous transmission of a 10 Mb/s data channel and receipt of a 40 kb/s command channel on the same modulator pixel on different time scales.

Figure 3:
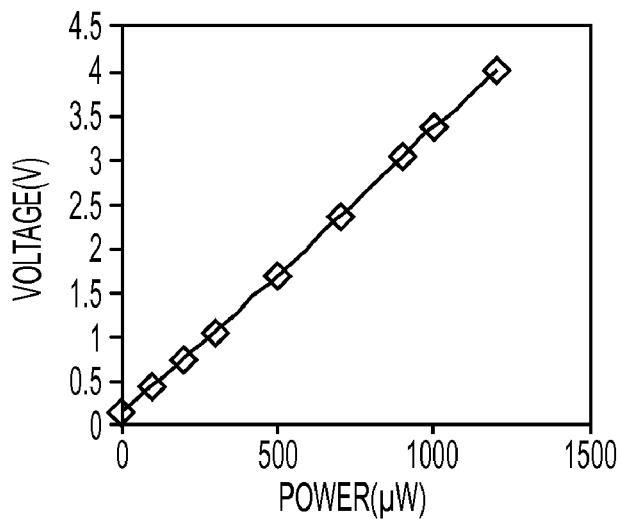
FIG. 3 shows the transimpedance voltage at the DC port versus illumination power in microWatts for the system of FIG. 2.

As discussed in previous paragraphs, the DC voltage at the DC port 120 indicates whether the pixel is illuminated, and controls whether or not to turn on the electronic driver for the modulator pixel. FIG. 3 is a plot of the transimpedance voltage at the DC port 120 versus illumination power in microWatts for an example system configured according to FIG. 2.

It is noted that FIG. 2 illustrates a circuit with a single electronic current driver, modulating retroreflector pixel, and transimpedance amplifier. The overall modulating retroreflector system can include a number of circuits, with one circuit for each of the modulating retroreflector pixels. At any given time, only a few of the pixels will be illuminated and only a few drivers will be operating to modulate those pixels. This configuration reduces the heat generated by the device and lowers the power requirement compared to driving all the modulators at all times regardless of the illumination spot location.

Figure 5:
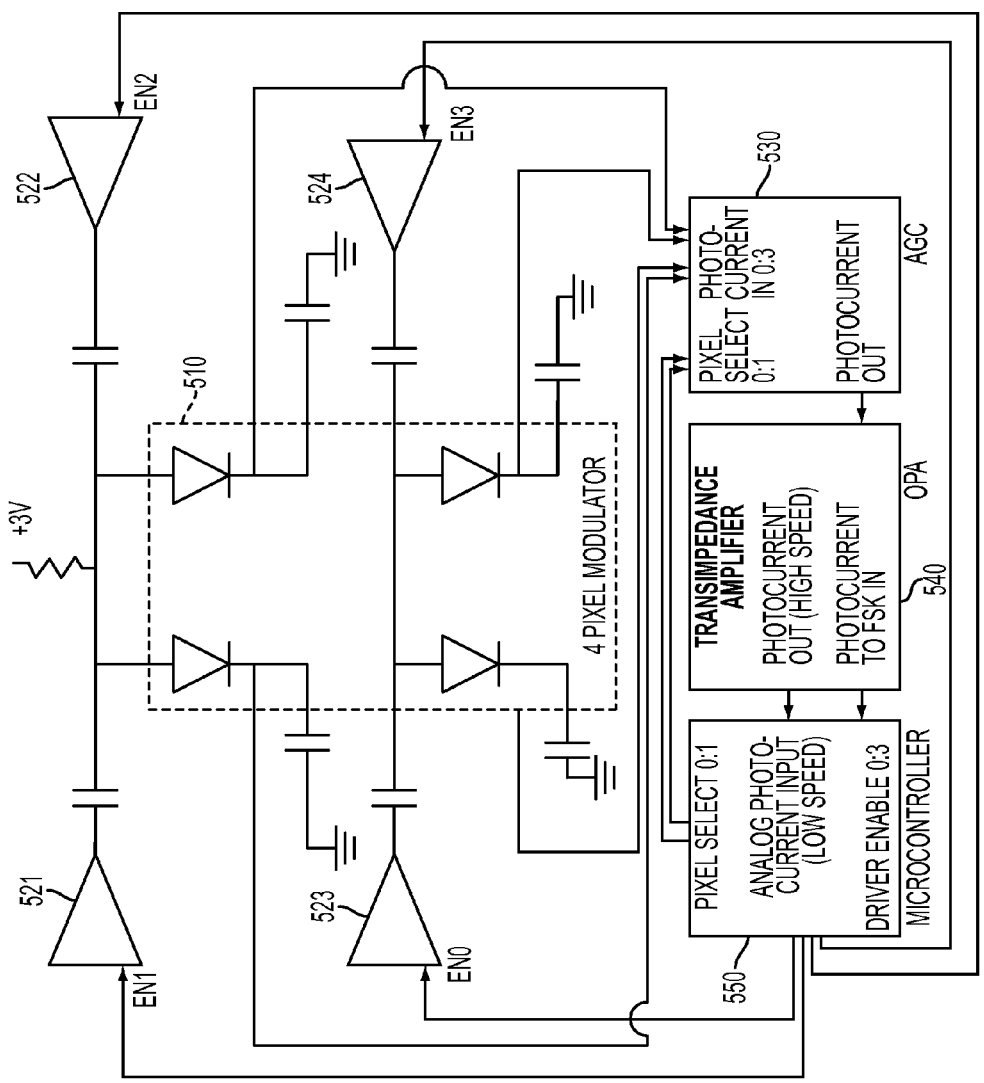
FIG. 5 shows an example of a modulating retroreflector system with a plurality of drivers and photodetectors for a single transimpedance amplifier.

As shown in FIG. 5, the system can also be configured with a single transimpedance amplifier for several drivers and photodetectors. This example illustrated four drivers 521-524 and a multiple quantum well modulating retroreflector 510 with four pixels 511-524, with the modulator pixel outputs being input to an automatic gain controller 530 and then to a single transimpedance amplifier 540. The microcontroller 550 activates the driver associated with the modulator pixel that has generated the largest photocurrent.

A suitable modulating retroreflector is described further in U.S. Pat. No. 7,719,746 to Goetz et al., the disclosure of which is incorporated by reference herein in its entirety. Each modulator pixel is a semiconductor-based optical switch based on multiple quantum wells. The multiple quantum well intrinsic portion of the modulator pixel includes many alternating layers of GaAs, AlGaAs, and InGaAs deposited on a GaAs semiconductor wafer or substrate. The substrate should be a material that is transparent at the desired optical wavelength (e.g., at the wavelength of the laser is expected to interrogate the remote station). A reflective aluminum layer can be formed on the opposite face of the substrate. Electrically, the modulator is configured as a PIN diode, being grown on the n-type GaAs wafer and being capped by a p-type contact layer with an electrode or contact. An n+ contact layer is arranged adjacent to the multiple quantum well layers and the GaAs substrate on the periphery of the pixel. Alternatively, multiple quantum well modulator can be configured as a flip chip, with the p+ contact layer of the pixels covered with a reflective metallic coating that acts as the electrode, and the incoming laser light being incident on the transparent GaAs substrate.

Other multiple quantum well modulating retroreflectors with different electrode configurations are also suitable. For example, a circular electrode configuration is described in Gilbreath, G. C., Rabinovich, W. S., Mahon, R., Swingen, L., Oh, E., Meehan, T., and Goetz, P., "Real-Time 1550 nm Retromodulated Video Link," in 2003 IEEE Aerospace Conference Proceedings, Vol. 4, pp. 1791-1797, March 2003.

The speed of quantum well modulators makes them particularly suitable for the system, however, other modulators can also be used.

One advantage of the system described herein is that the modulator array and associated circuitry can activate individual drivers for the individual illuminated pixels, which reduces the power requirement and potential cooling requirements. In addition, because the system can self-detect the illuminated pixels, there is no need for a separate angle of arrival sensor and its associated beamsplitters, optics, and photodiode array.

Another advantage of the system described herein is that it provides a simultaneous bidirectional data link between the ground station and the remote terminal. In contrast, previous systems have required a half-duplex communication protocol at the physical laser as the beam at the ground station switched from interrogate (DC beam) to transmit (pulsed).

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A modulating retroreflector system comprising:
   a modulating retroreflector having a plurality of multiple quantum well modulator pixels;
   at least one transimpedance amplifier, said transimpedance amplifier arranged to receive a photocurrent generated by one of the plurality of modulator pixels; and
   each modulator pixel being capacitively coupled to a current driver, the current driver being configured to apply a high frequency digital electrical signal to the modulator pixel only if the DC voltage output of the transimpedance amplifier exceeds a threshold value.

2. The retroreflector system according to claim 1, further comprising:
   a cat's eye optic arranged to focus incoming light onto the plurality of multiple quantum well modulator pixels.

3. The retroreflector system according to claim 1, wherein said pixels include a reflective coating arranged at the side of the pixels facing away from the cat's eye optics.

4. The retroreflector system according to claim 1, wherein said high frequency digital electrical signal is Manchester encoded data.

5. The retroreflector system according to claim 1, with a one-to-one correspondence between the pixels and the transimpedance amplifiers.

6. The retroreflector system according to claim 1, wherein each of the at least one transimpedance amplifiers receives photocurrents from a plurality of modulator pixels.

7. The retroreflector system according to claim 1, wherein the transimpedance amplifier output is low-pass filtered.

8. The retroreflector system according to claim 1, further comprising:
an output port at the output of the transimpedance amplifier, said output port being configured to output a low frequency signal carried on an optical interrogation beam.

9. The retroreflector system according to claim 1, wherein the input to the transimpedance amplifier is low-pass filtered.

10. The retroreflector system according to claim 1, in combination with a remote optical assembly having both a transmitter and receiver, said transmitter configured to transmit laser optical energy to the retroreflector system, the receiver configured to receive the modulated retroreflected optical energy from the retroreflector system.

11. A method for receiving optical energy from a laser source, modulating the optical energy, and retroreflecting the modulated optical energy toward the laser source, in a modulating retroreflector system having an array of multiple quantum well modulator pixels, the method comprising:
receiving the laser optical energy so as to illuminate at least one of the pixels;
each of the illuminated pixels generating a DC photocurrent;
transmitting each generated DC photocurrent into a transimpedance amplifier;
activating a current source coupled to the illuminated pixel only if the DC voltage output of the transimpedance amplifier exceeds a threshold value; and
the current source driving said illuminated pixel with a digital signal to modulate the incoming optical energy.

12. The method according to claim 11, further comprising:
each of the illuminated multiple quantum well modulating retroreflector pixels reflecting the modulated incoming optical energy toward the laser source.

13. The method according to claim 11, wherein the digital signal is Manchester encoded.

14. The method according to claim 11, wherein each transimpedance amplifier receives DC photocurrent from only one modulator pixel.

15. The method according to claim 11, wherein each transimpedance amplifier receives photocurrents from a plurality of modulator pixels.

16. The method according to claim 11, wherein the received optical energy from a laser source is continuous wave optical energy.

17. The method according to claim 11, wherein said incoming optical energy is a continuous wave interrogation beam carrying a low frequency signal, the method further comprising:
outputting the low frequency signal at an output port of the transimpedance amplifier.

18. The method according to claim 17, wherein the low frequency signal is a frequency shift keyed signal.

19. The method according to claim 17, wherein the low frequency signal has a frequency of less than 100 kHz.

* * * * *